(12) United States Patent
Ishida

(10) Patent No.: US 8,662,681 B2
(45) Date of Patent: Mar. 4, 2014

(54) LENS-SHIFTABLE IMAGE PROJECTION APPARATUS

(75) Inventor: Yusuke Ishida, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 160 days.

(21) Appl. No.: 13/102,487

(22) Filed: May 6, 2011

(65) Prior Publication Data

US 2011/0273674 A1 Nov. 10, 2011

(30) Foreign Application Priority Data

May 6, 2010 (JP) ................................. 2010-106413

(51) Int. Cl.
*G03B 21/14* (2006.01)
*G03B 3/00* (2006.01)
*G02B 7/02* (2006.01)

(52) U.S. Cl.
USPC ............ 353/101; 359/813; 359/820; 359/823

(58) Field of Classification Search
USPC ........ 353/101, 100, 69, 70, 121, 76; 359/813, 359/820, 814, 823, 825, 826, 827, 694, 695, 359/697, 698, 649–651; 352/140; 396/343
See application file for complete search history.

(56) References Cited

U.S. PATENT DOCUMENTS

| 7,494,229 B2 * | 2/2009 | Miyasaka ..................... 353/101 |
| 2005/0001999 A1 | 1/2005 | Eguchi |
| 2007/0182940 A1 | 8/2007 | Asai |
| 2007/0252955 A1 | 11/2007 | Asai |
| 2008/0231818 A1 | 9/2008 | Shinozaki |

FOREIGN PATENT DOCUMENTS

| JP | 05-027324 | 2/1993 |
| JP | 2003-262893 A | 9/2003 |
| JP | 2007-241260 | 9/2007 |
| JP | 2008-233551 | 10/2008 |

OTHER PUBLICATIONS

Extended European Search Report for corresponding EP 11003613. 4, dated Aug. 31, 2011.

* cited by examiner

*Primary Examiner* — William C Dowling
*Assistant Examiner* — Ryan Howard
(74) *Attorney, Agent, or Firm* — Rossi, Kimms & McDowell LLP

(57) ABSTRACT

The image projection apparatus projects an image onto a projection surface through a projection optical system including a focus element (104) movable in an optical axis direction. The apparatus includes a shift mechanism that moves the projection optical system in a shift direction including a directional component orthogonal to the optical axis direction so as to move a position of the projected image on the projection surface, a shift position detector that detects a shift position of the projection optical system moved by the shift mechanism, a temperature detector that detects a temperature, and a controller that moves the focus element. The controller moves the focus element depending on the temperature detected by the temperature detector and on the shift position detected by the shift position detector.

3 Claims, 6 Drawing Sheets

| | | LENS SHIFT AMOUNT K | | | | | |
|---|---|---|---|---|---|---|---|
| | | 0.0 | 0.2 | 0.4 | ... | 0.8 | 1.0 |
| TEMPERATURE VARIATION AMOUNT x | -40 | 120 | 121 | 123 | ... | 130 | 132 |
| | -39 | 110 | 111 | 114 | ... | 121 | 123 |
| | -38 | 100 | 101 | 104 | ... | 111 | 112 |
| | ... | ... | ... | ... | ... | ... | ... |
| | 0 | 0 | 0 | 0 | ... | 0 | 0 |
| | ... | ... | ... | ... | ... | ... | ... |
| | +39 | -80 | -80 | -79 | ... | -76 | -76 |
| | +40 | -85 | -85 | -84 | ... | -77 | -77 |

LENS-SHIFTABLE IMAGE PROJECTION APPARATUS

BACKGROUND OF THE INVENTION

1. Field of the Invention

The present invention relates to an image projection apparatus such as a liquid crystal projector, and particularly to an image projection apparatus having a projection lens shifting function and a temperature focus correcting function.

2. Description of the Related Art

Image projection apparatuses introduce light from a light source to a projection lens (projection optical system) through a light modulating element such as a liquid crystal panel or a digital micro-mirror device, and project an image onto a projection surface such as a screen through the projection lens.

In such image projection apparatuses, variation in temperature thereof often generates focus variation of the projection lens, which causes the apparatus to project an out-of-focus image. Thus, some image projection apparatuses are provided with a temperature focus correction function to correct the focus variation of the projection lens due to the temperature variation. Japanese Patent Laid-Open No. 2007-241260 discloses an image projection apparatus that controls a position of a focus lens included in a projection lens depending on a temperature detected by a temperature sensor to perform temperature focus correction of the projection lens.

Moreover, Japanese Patent Laid-Open No. 05-027324 discloses an image projection apparatus that has a lens shift mechanism to move (shift) a projection lens in a direction orthogonal to its optical axis with respect to a light modulating element so as to adjust a projection position of an image on a projection surface.

However, such lens shift changes an area (light passing area) of the projection lens through which light from the light modulating element passes, and therefore focus variation amounts (that is, out-of-focus amounts of projected images) for a same temperature variation amount are mutually different.

FIG. 9 shows (A) a situation in which a projection lens 105 is located at a shift position where light from a light modulating element 102 passes through a central area of the projection lens 105 to reach a projection surface 401, and (B) a situation in which the projection lens 105 is located at another shift position where the light from the light modulating element 102 passes through a marginal area of the projection lens 105 to reach the projection surface 401. In FIG. 9, reference numeral 402 denotes a lens shift amount, and reference numeral 403 denotes a shift amount of the projected image on the projection surface 401. Reference numeral 101 denotes a light source lamp.

In the two situations (A) and (B) shown in FIG. 9, since optical path lengths from the projection lens 105 to the projection surface 401 are different from each other, the out-of-focus amounts of the projected images on the projection surface 401 are mutually different even if the temperature variation amounts are equal to each other.

The temperature focus correction performed in the apparatus disclosed in Japanese Patent Laid-Open No. 2007-241260 cannot reduce such out-of-focus amounts corresponding to the shift positions (shift amounts) of the projection lens only by itself.

SUMMARY OF THE INVENTION

The present invention provides an image projection apparatus capable of performing sufficient temperature focus correction while having a projection lens shift function.

The present invention provides as one aspect thereof an image projection apparatus configured to project an image onto a projection surface through a projection optical system including a focus element movable in an optical axis direction. The apparatus includes a shift mechanism configured to move the projection optical system in a shift direction including a directional component orthogonal to the optical axis direction so as to move a position of the projected image on the projection surface, a shift position detector configured to detect a shift position of the projection optical system moved by the shift mechanism, a temperature detector configured to detect a temperature, and a controller configured to move the focus element. The controller is configured to move the focus element depending on the temperature detected by the temperature detector and on the shift position detected by the shift position detector.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
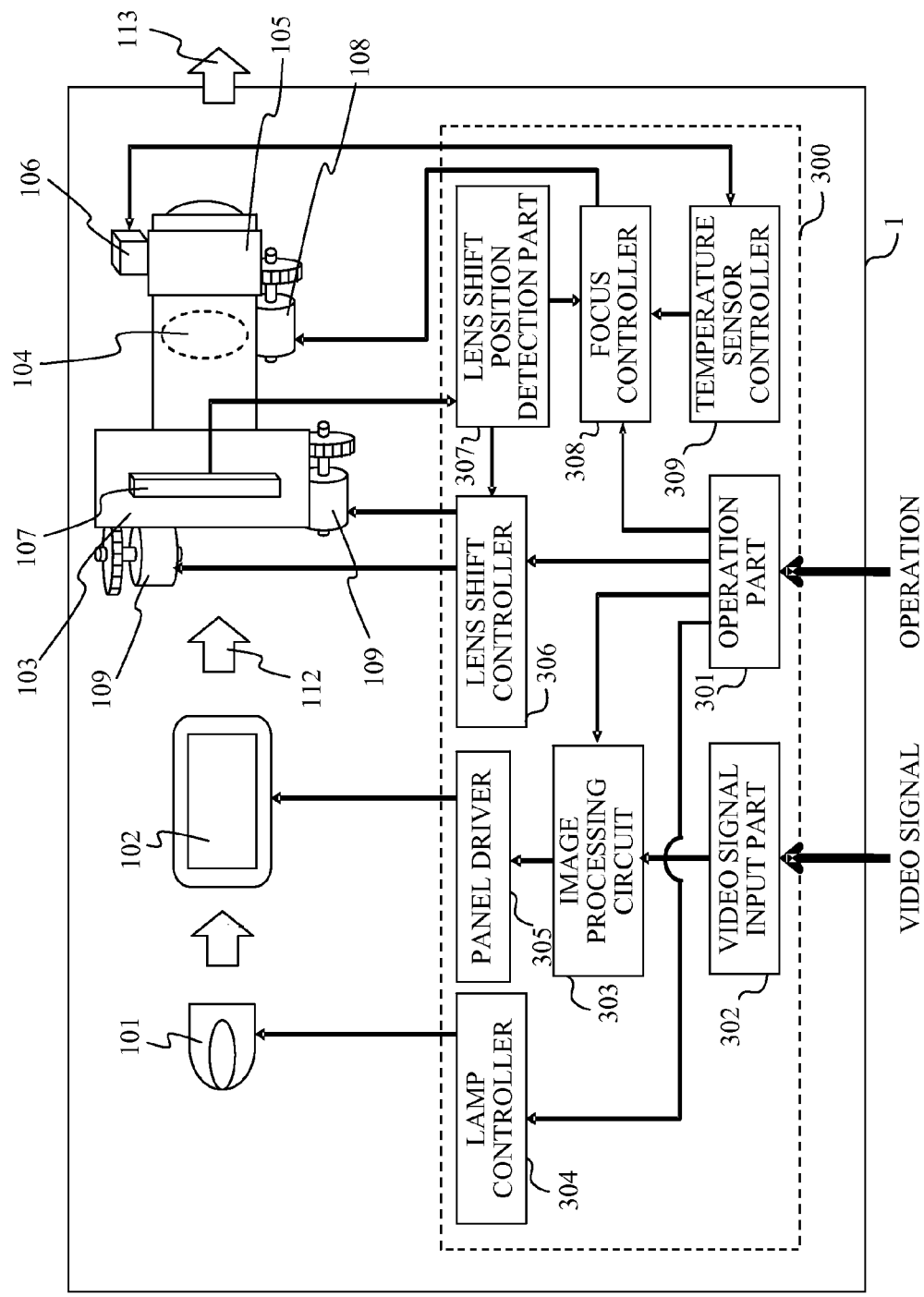
FIG. 1 is a block diagram showing a configuration of an image projection apparatus that is Embodiment 1 of the present invention.

FIG. 1 shows a configuration of a liquid crystal projector (image projection apparatus) 1 that is a first embodiment (Embodiment 1) of the present invention.

Light emitted from a light source lamp 101 enters a liquid crystal panel 102 as a light modulating element. The liquid crystal panel 102 forms an original image corresponding to a video signal input to the projector 1, and therefore the light entering the liquid crystal panel 102 is modulated according to the original image to become modulated light 112.

The modulated light 112 is projected onto a projection surface such as a screen (not shown) through a projection lens (projection optical system) 105 as projection light 113. The projection lens 105 includes a focus lens (focus element) 104 that is movable in an optical axis direction of the projection lens 105. Thus, an image (projected image) is displayed on the projection surface.

The projector 1 includes a lens shift mechanism 103 that moves (shifts) the projection lens 105 in a horizontal direction and a vertical direction that are directions including a directional component orthogonal to the optical axis direction of the projection lens 105. The lens shift mechanism 103 includes two shift motors 109, and shifts the projection lens 105 in the horizontal direction by a driving force from the one shift motor 109 and shifts the projection lens 105 in the vertical direction by a driving force from the other shift motor 109.

The lens shift mechanism 103 includes linear encoders 107 to detect shift positions of the projection lens 105 (hereinafter referred to as "lens shift positions") in the horizontal and vertical directions. Each of the linear encoders 107 outputs a signal corresponding to a shift amount (movement amount) of the projection lens 105, that is, the lens shift position, with respect to a predetermined reference shift position.

The focus lens 104 included in the projection lens 105 moves in the optical axis direction of the projection lens 105 by a driving force from a focus motor 108. Moving the focus lens 104 changes a focus state of the projected image.

Inside the projector 1, a temperature sensor 106 is installed. The projector 1 performs a temperature focus correction process, which will be described later, depending on a temperature detected by the temperature sensor 106. It is desirable that the temperature sensor 106 be placed near the projection lens 105. However, the temperature sensor 106 may be placed at a position away from the projection lens 105 as long as it is a position where a correlation of variation amounts of an output from the temperature sensor 106 and variation amounts of the focus state of the projected image is established. Plural temperature sensors may be installed in the projector 1 to use a mean value of temperatures detected thereby for the temperature focus correction process.

The projector 1 includes a main controller 300 as an electric circuit. The main controller 300 is provided with an operation part 301 including operation members such as switches, buttons and dials, and outputs operation signals corresponding to operations of the operation members by a user to a lamp controller 304, an image processing circuit 303, a lens shift controller 306 and a focus controller 308.

The lamp controller 304 switches on and off of the light source lamp 101 in response to a lamp on/off operation signal from the operation part 301. A video signal input part 302 receives a video signal from an external image supply apparatus (not shown) such as a personal computer, and sends it to the image processing circuit 303. The image processing circuit 303 performs scaling, transformation and color conversion on the received video signal, and transmits image data produced by these processes to a panel driver 305. Moreover, the image processing circuit 303 produces an OSD image showing a menu image or the like, and transmits it to the panel driver 305.

The panel driver 305 drives the liquid crystal panel 102 based on the image data transmitted from the image processing circuit 303 to cause the liquid crystal panel 102 to form the original image.

The lens shift controller 306 drives the above-described two shift motors 109 in response to a horizontal/vertical lens shift operation signal from the operation part 301 to move the lens shift mechanism 103 so as to shift the projection lens 105 in the horizontal direction or the vertical direction.

A lens shift position detection part 307 reads the outputs from the linear encoders 107 installed in the lens shift mechanism 103 to acquire the lens shift positions in the horizontal and vertical directions. Then, the lens shift position detection part 307 sends information on the lens shift positions to the focus controller 308. The linear encoders 107 and the lens shift position detection part 307 constitute a shift position detector.

A temperature sensor controller 309 acquires the temperatures detected by the temperature sensor 106 at a predetermined time interval, and sends information on the acquired temperatures to the focus controller 308. The temperature sensor 106 and the temperature sensor controller 309 constitute a temperature detector.

The focus controller 308 as a controller drives the focus motor 108 in response to a focus operation signal from the operation part 301 to move the focus lens 104. Moreover, the focus controller 308 performs the temperature focus correction process by using a detection result of the lens shift position from the lens shift position detection part 307 and a detection result of the temperature from the temperature sensor controller 309.

Next, description will be made of the temperature focus correction process performed by the focus controller 308 with reference to a flowchart shown in FIG. 2. The focus controller 308 executes this process according to a computer program.

In response to power-on of the projector 1, the focus controller 308 performs initialization of the temperature focus correction process. In this initialization, the focus controller 308 at step 40 acquires information on a current temperature (temperature at the time of power-on) from the temperature sensor controller 309, and stores it as a variable To to a memory (not shown).

After the initialization of the temperature focus correction process, the focus controller 308 starts the temperature focus correction process in response to an instruction for starting this process through the operation part 301 or an arrival of a predetermined timing that is automatically counted.

First at step 41, the focus controller 308 acquires information on a current temperature (temperature at the time of executing this step) from the temperature sensor controller 309, and stores it as a variable Tn to the memory.

Next, at step 42, the focus controller 308 calculates a temperature variation amount that is a difference (To−Tn) between the variables To and Tn, and stores the temperature variation amount as a variable Td to the memory.

Next, at step 43, the focus controller 308 compares the temperature variation amount stored to the memory as the variable Td with a predetermined threshold. If the temperature variation amount (Td) is larger than the threshold, the focus controller 308 proceeds to step 44. If the temperature variation amount (Td) is equal to or smaller than the threshold, the focus controller 308 proceeds to step 46.

At step 44, the focus controller 308 calculates a movement amount of the focus lens 104 (hereinafter referred to as a "focus correction amount") by using a function f including the temperature variation amount (Td) as a parameter, and stores it as a variable D to the memory. The focus correction amount includes information on a direction to move the focus lens 104. A more detailed description of the function f will be made later.

Next at step 45, the focus controller 308 drives the focus motor 108 to move the focus lens 104 by the focus correction amount (D). Then, at step 46, the focus controller 308 stores the value of the variable Tn as the variable To, and ends one routine of the temperature focus correction process.

Thereafter, the focus controller 308 periodically performs such a temperature focus correction process (processes from step 41 to step 46) at a predetermined time interval (for example, at one minute interval).

Next, description will be made of the function f. This function f is a function to calculate the focus correction amounts for the temperature variation amounts. This embodiment defines the focus correction amount f(x) for the temperature variation amount x(=To-Tn) by the following expression (1) as one example:

$$f(x)=Ax^2+Bx+C \quad (1)$$

Figure 3:
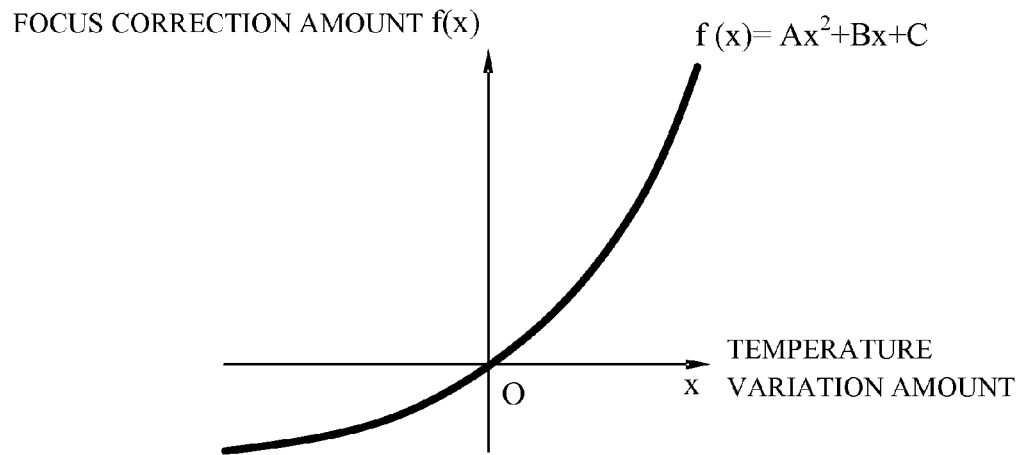
FIG. 3 is a graph showing a relationship between temperature variation amounts and focus correction amounts in Embodiment 1.

FIG. 3 shows the expression (1). In FIG. 3, a horizontal axis show the temperature variation amount x, and a vertical axis shows the focus correction amount f(x).

This embodiment changes coefficients A, B and C in the expression (1) depending on the lens shift position, which changes the focus correction amount f(x) for the respective lens shift positions even though the temperature variation amount x is fixed.

Figures 5, 6:
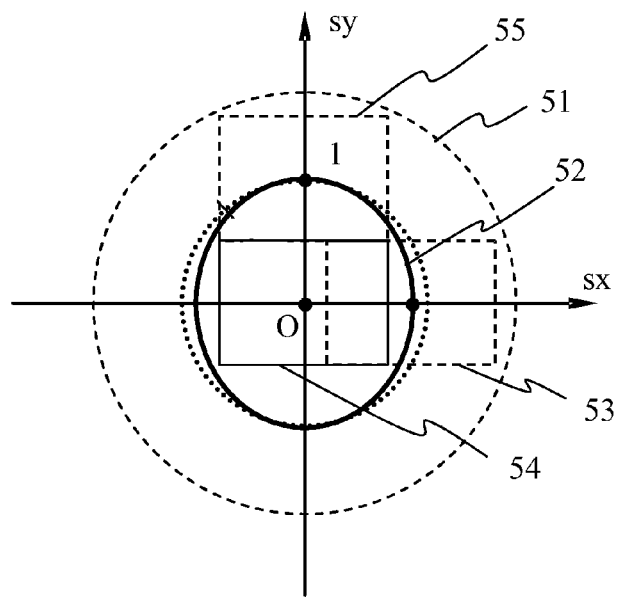
FIG. 5 shows a shiftable range of a projection lens in Embodiment 1.
FIG. 6 shows a data table including focus correction amounts depending on temperature variation amounts and lens shift positions in an image projection apparatus that is Embodiment 2 of the present invention.

FIG. 5 shows a relationship of actual shift positions of the projection lens 105 and horizontal and vertical lens shift positions sx and sy where ($sx^2+sy^2$) is equal to or smaller than 1 (≤1). A lens shift position where a position of the optical axis of the projection lens 105 coincides with a center of the original image formed on the liquid crystal panel 102 is shown by sx=sy=0.

FIG. 5 shows the projection lens 105 viewed from the optical axis direction. The modulated light (projected light) from the liquid crystal panel 102 should pass through an effective area 51 of the projection lens 105. The shift of the projection lens 105 changes an area (partial area) through which the modulated light passes in the effective area 51.

A light passing area 54 is a partial area through which the modulated light passes in the effective area 51 when the position of the optical axis of the projection lens 105 coincides with the center of the original image and a center of the projected image. Such a position of the projection lens 105 corresponds to the above-described reference shift position. A light passing area 53 is a partial area through which the modulated light passes in the effective area 51 when the projection lens 105 is shifted to a horizontal shift end position from the reference shift position. A light passing area 55 is a partial area through which the modulated light passes in the effective area 51 when the projection lens 105 is shifted to a vertical shift end position from the reference shift position.

Since this embodiment projects an image having a longer horizontal side length than a vertical side length, a vertical lens shiftable amount is larger than a horizontal lens shiftable amount. When the larger vertical lens shiftable amount from the reference shift position is defined as 1, a lens shiftable range 52 showing variable ranges of sx and sy becomes an elliptical range as shown in FIG. 5.

Figure 4:
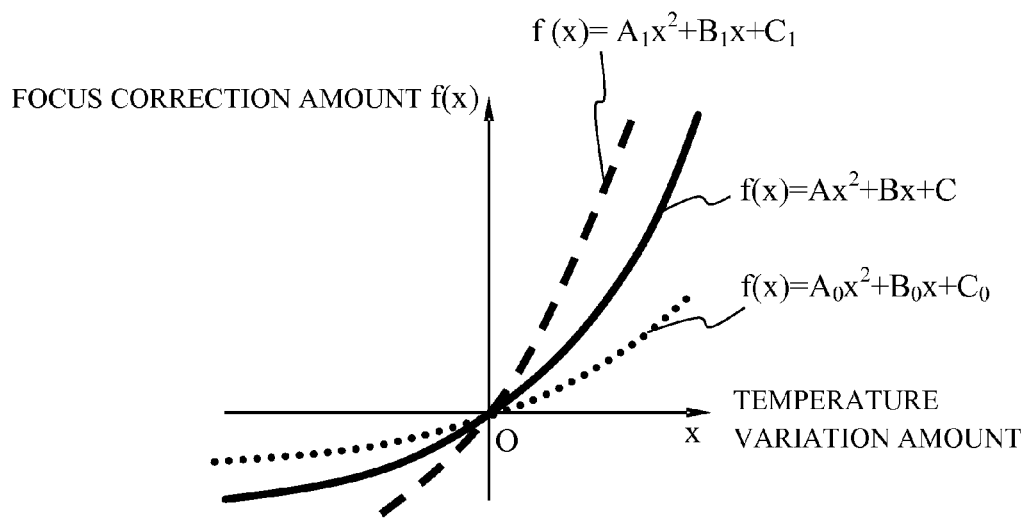
FIG. 4 is a graph showing a relationship between temperature variation amounts and focus correction amounts depending on lens shift positions in Embodiment 1.

FIG. 4 shows the function f (the coefficients are shown by $A_0$, $B_0$ and $C_0$) when the horizontal and vertical lens shift positions sx and sy are 0, and the function f (the coefficients are shown by $A_1$, $B_1$ and $C_1$) when a distance of the shift position of the projection lens 105 from the reference shift position is 1, that is, $sx^2+sy^2=1$. In addition, FIG. 4 also shows the function f (the coefficients are shown by A, B and C) when the horizontal and vertical lens shift positions sx and sy are neither 0 nor values satisfying $sx^2+sy^2=1$. In FIG. 4, a horizontal axis shows the temperature variation amount x, and a vertical axis shows the focus correction amount f(x). As understood from FIG. 4, the focus correction amount f(x) increases as the temperature variation amount x increases, and the focus correction amount f(x) for the same temperature variation amount increases as the distance of the shift position of the projection lens 105 from the reference shift position increases.

The coefficients A, B and C corresponding to the respective lens shift positions can be obtained by the following calculation expressions (2) to (5) using the coefficients $A_0$, $B_0$, $C_0$, $A_1$, $B_1$ and $C_1$ decided in design or by experiments. K represents a lens shift amount corresponding to the shift amount of the projection lens 105 from the reference shift position.

$$K=\sqrt{(sx^2+sy^2)} \quad (2)$$

$$A=KA_1+(1-K)A_0 \quad (3)$$

$$B=KB_1+(1-K)B_0 \quad (4)$$

$$C=KC_1+(1-K)C_0 \quad (5)$$

Then, applying the coefficients A, B and C calculated by the above calculation expressions (3) to (5) to the expression (1) makes it possible to calculate the focus correction amounts f(x) depending on the temperature variation amount and on the lens shift position, in other words, to calculate the focus correction amounts f(x) for the respective temperature variation amounts appropriate for the respective lens shift positions.

As described above, this embodiment corrects (changes) the focus correction amount for the temperature variation amount depending on the lens shift position. Therefore, this embodiment can sufficiently correct focus variation of the projection optical system due to temperature variation, that is, reduce an out-of-focus amount of the projected image, regardless of the shift position of the projection lens 105.

Although this embodiment defines the function f as a quadratic function, definition of the function f may be made by using other functions such as a linear function, a cubic function and an exponent function as long as using a function capable of well approximating the focus correction amounts for the temperature variation amounts. This also applies to Embodiment 3 described later.

Embodiment 2

Next, description will be made of a second embodiment (Embodiment 2) of the present invention. Although Embodiment 1 described the case where the temperature focus correction process shown in FIG. 2 performs calculation of the focus correction amount at step 44 by using the function f including the temperature variation amount as a parameter, the focus correction amount may be read from a data table prestored in the memory.

FIG. 6 shows a data table including data of focus correction amounts corresponding to representative lens shift amounts (representative shift amounts from the reference shift position) K and to representative temperature variation amounts x. The representative lens shift amounts K are calculated by the expression (2) described in Embodiment 1. The data table sets the representative temperature variation amounts x within a range from −40° C. to +40° C. at 1° C. intervals, and sets the representative lens shift amounts K within a range from 0.0 to 1.0 at 0.2 intervals, and therefore stores 486(=81× 6) focus correction amounts. The ranges and the intervals of the representative temperature variation amounts and the representative lens shift amounts may be arbitrarily changed.

If the detected temperature variation amount or the detected lens shift amount is a value between two representative values (representative temperature variation amounts or representative lens shift amounts), a focus correction value corresponding to a closer one of the two representative values to the detected value than the other may be used. Moreover, a focus correction value being used may be calculated by interpolation using the two representative values.

Figure 2:
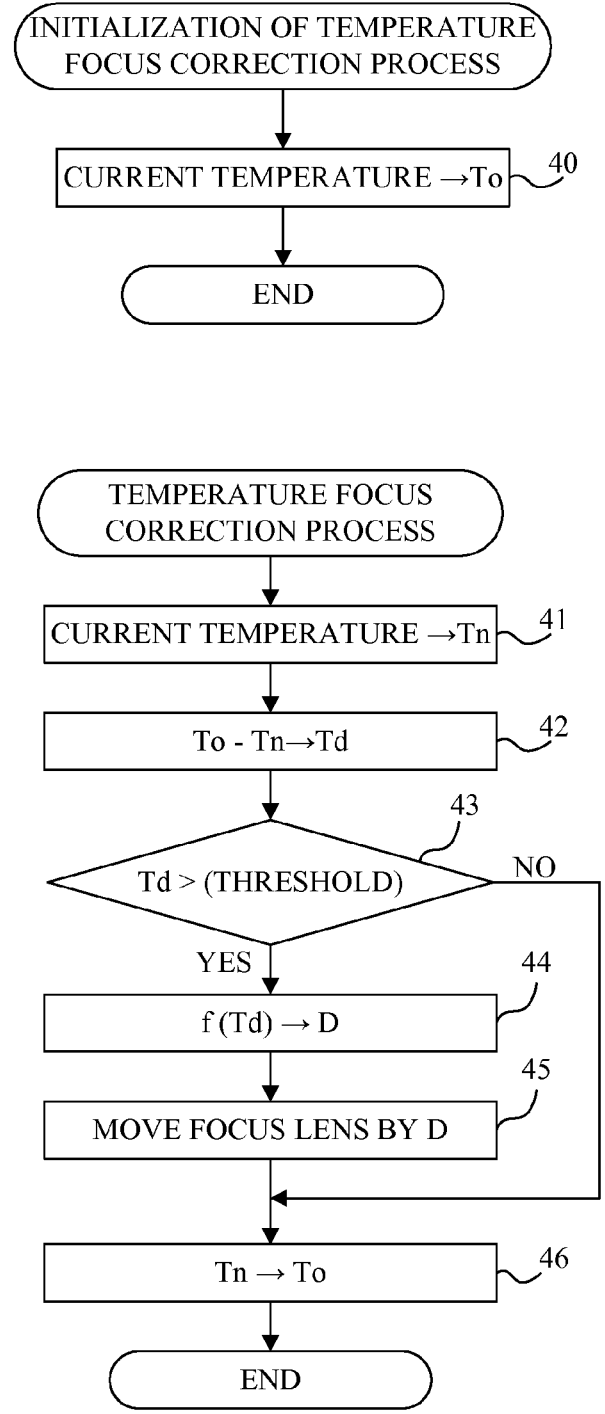
FIG. 2 is a flowchart showing a temperature focus correction process in Embodiment 1.

Then, at step 45 shown in FIG. 2, the focus controller 308 drives the focus motor 108 to move the focus lens 104 by the focus correction amount (D) decided using such a data table, which enables performing of the temperature focus correction appropriate for the shift position of the projection lens 105.

Embodiment 3

Next, description will be made of a third embodiment (Embodiment 3) of the present invention. Although Embodiments 1 and 2 described the cases where the focus correction amount for the detected lens shift position (lens shift amount) and the detected temperature variation amount is obtained by calculation or by reading from the data table, Embodiment 3 corrects (changes) a detected temperature variation amount depending on a lens shift position (lens shift amount), and then obtains a focus correction amount for the corrected (changed) temperature variation amount.

Figure 7:
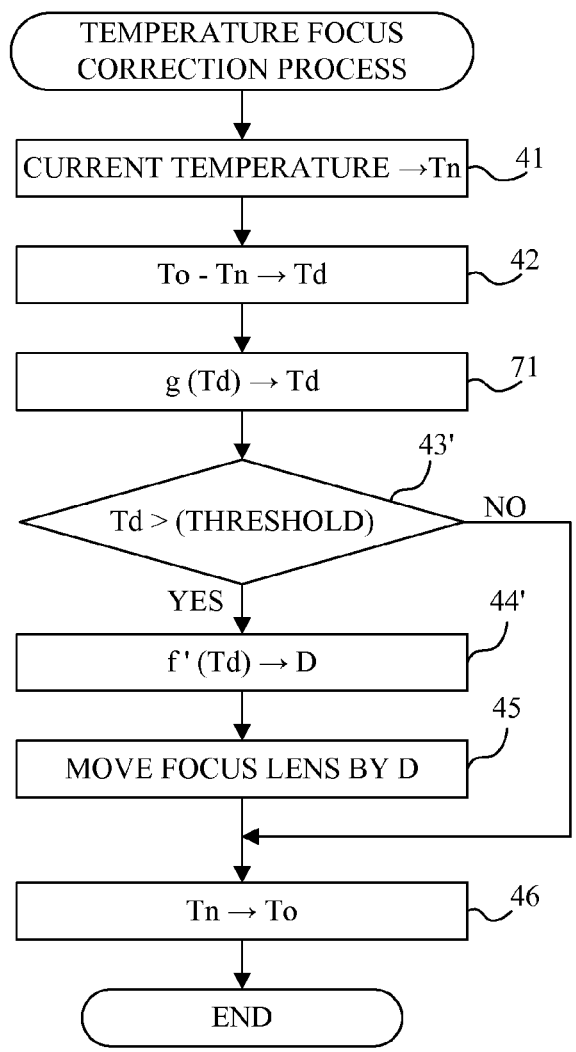
FIG. 7 is a flowchart showing a temperature focus correction process in an image projection apparatus that is Embodiment 3 of the present invention.

FIG. 7 shows a flowchart showing a temperature focus correction process in this embodiment. Same steps in this embodiment (FIG. 7) as those in Embodiment 1 (FIG. 2) are denoted by same reference numerals as those in FIG. 2, and descriptions thereof are omitted.

In this embodiment, step 71 is added next to step 42. At step 71, the focus controller 308 corrects the temperature variation amount Td (=To−Tn) calculated at step 42 by a function g including the temperature variation amount Td as a parameter. The calculated temperature variation amount Td is hereinafter referred to as a "detected temperature variation amount". Then, the focus controller 308 restores the corrected detected temperature variation amount (hereinafter simply referred to as a "corrected temperature variation amount") as the variable Td to the memory.

Thereafter, at next step 43', the focus controller 308 compares the corrected temperature variation amount (Td) with a predetermined threshold. If the corrected temperature variation amount (Td) is larger than the threshold, the focus controller 308 proceeds to step 44'. If the corrected temperature variation amount (Td) is not larger than the threshold, the focus controller 308 proceeds to step 46.

At step 44', the focus controller 308 calculates a focus correction amount by using a function f' including the corrected temperature variation amount (Td) as a parameter, and stores the calculated focus correction amount as a variable D to the memory. A more detailed description of the function f' will be made later.

Description will be made of the function g being used at step 71. This function g is a function to correct the detected temperature variation amount x depending on the lens shift amount. This embodiment defines the corrected temperature variation amount g(x) as follows:

$$g(x)=(RK+1)x \quad (6)$$

where R represents an arbitrary coefficient decided in design or by experiments, and K represents the lens shift amount defined by the expression (2) shown in Embodiment 1.

Figure 8:
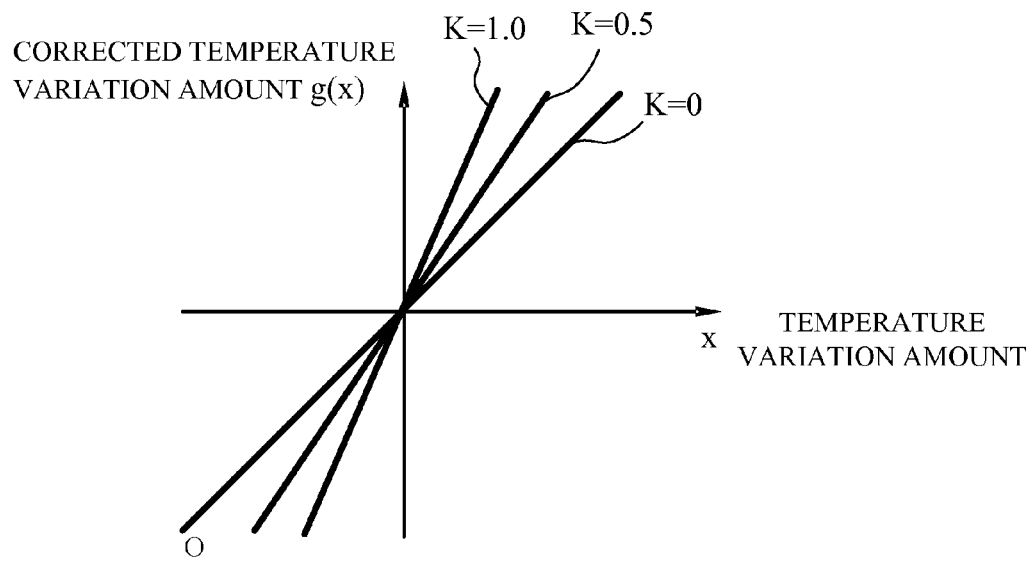
FIG. 8 is a graph showing a relationship between temperature variation amounts and focus correction amounts depending on lens shift positions in Embodiment 3.
Figure 9:
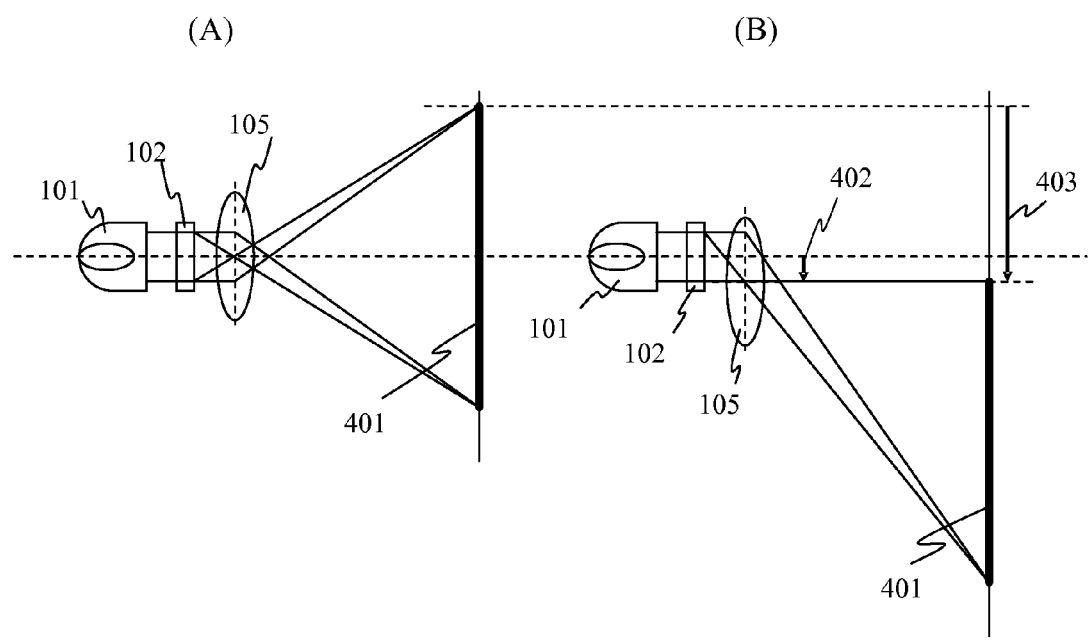
FIG. 9 shows a difference of focus variation amounts depending on lens shift.

As an example, FIG. 8 shows various corrected temperature variation amounts g(x) when R is +0.5. As shown in FIG. 8, changing the lens shift amount K changes the corrected temperature variation amount g(x) for a same detected temperature variation amount x. Specifically, the corrected temperature variation amount g(x) for the same detected temperature variation amount x increases as the lens shift amount K increases.

Next, description will be made of the function f' being used at step 44'. The function f' is a function to calculate the focus correction amount for the corrected temperature variation amount g(x). This embodiment uses, as the function f', the expression (1) including the fixed coefficients A, B and C regardless of the lens shift amount (see FIG. 3). The coefficients A, B and C are decided in design or by experiments such that the function f' shows a focus correction amount when the projection lens 105 is located at the reference shift position (sx=sy=0).

This embodiment also changes the focus correction amount for the temperature variation amount depending on the lens shift position. Therefore, this embodiment also can sufficiently correct focus variation of the projection optical system due to temperature variation, that is, reduce an out-of-focus amount of the projected image, regardless of the shift position of the projection lens 105.

In addition, this embodiment can further reduce an entire calculation amount to obtain the focus correction amount as compared with Embodiment 1.

This embodiment described the case where the detected temperature variation amount (To−Tn) is corrected depending on the lens shift position to obtain the corrected temperature variation amount. However, the corrected temperature variation amount may be obtained as a difference between the temperatures To and Tn detected and corrected depending on the respective lens shift amounts.

Although each of the above embodiments described the liquid crystal projector, alternative embodiments of the present invention include projectors, other than the liquid crystal projector, using a digital micro-mirror device or a laser scanning device.

Moreover, in the embodiments of the present invention, the projection optical system is not limited to a lens system, and may be an optical system formed by using other optical elements such as a prism or a mirror.

Furthermore, in the embodiments of the present invention, the projector is not limited to a projection-lens-integrated projector, and may be a projection-lens-interchangeable projector.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-106413, filed on May 6, 2010, which is hereby incorporated by reference herein in its entirety.

What is claimed is:

1. An image projection apparatus configured to project an image onto a projection surface through a projection optical system including a focus element movable in an optical axis direction, the apparatus comprising:
   a shift mechanism configured to move the projection optical system in a shift direction including a directional component orthogonal to the optical axis direction so as to move a position of the projected image on the projection surface;
   a shift position detector configured to detect a shift position of the projection optical system moved by the shift mechanism;

a temperature detector configured to detect a temperature; and a controller configured to move the focus element, wherein the controller is configured to move the focus element by a movement amount changing depending on both the temperature detected by the temperature detector and the shift position detected by the shift position detector.

2. An image projection apparatus according to claim 1, wherein the controller is configured to move the focus element by the movement amount changing depending on both a variation amount of the temperature detected by the temperature detector and the shift position detected by the shift position detector, and wherein the movement amount for a same variation amount of the detected temperature changes depending on the detected shift position.

3. An image projection apparatus according to claim 1, wherein the controller is configured to change the temperature or a variation amount of the temperature detected by the temperature detector depending on the shift position detected by the shift position detector, and to move the focus element by the movement amount changing depending on the changed temperature or the changed temperature variation amount.

* * * * *